US011097859B2

(12) United States Patent
Vernier (10) Patent No.: US 11,097,859 B2
(45) Date of Patent: Aug. 24, 2021

(54) METHOD FOR PRODUCING A PACKAGED PORTION OF A FOOD PRODUCT AND PORTION PRODUCED BY SAID METHOD (71) Applicant: FROMAGERIES BEL, Suresnes (FR)

(72) Inventor: Alexandre Vernier, Naveil (FR)

(73) Assignee: BEL, Suresnes (FR)

( * ) Notice: Subject to any disclaimer, the term of this patent is extended or adjusted under 35 U.S.C. 154(b) by 0 days.

(21) Appl. No.: 15/566,801

(22) PCT Filed: Apr. 14, 2016

(86) PCT No.: PCT/EP2016/058283
§ 371 (c)(1),
(2) Date: Oct. 16, 2017

(87) PCT Pub. No.: WO2016/166249
PCT Pub. Date: Oct. 20, 2016

(65) Prior Publication Data
US 2018/0118382 A1 May 3, 2018

(30) Foreign Application Priority Data

Apr. 17, 2015 (FR) .................................... 15 53452

(51) Int. Cl.
*B65B 7/20* (2006.01)
*B65B 7/28* (2006.01)
(Continued)

(52) U.S. Cl.
CPC ............ *B65B 7/2878* (2013.01); *A23C 19/00* (2013.01); *B65B 3/04* (2013.01); *B65B 7/20* (2013.01);
(Continued)

(58) Field of Classification Search
CPC .......... B65B 7/2878; B65B 7/20; B65B 7/26; B65B 3/04; B65D 85/76; B65D 75/68; B65D 75/26; A23C 19/00
See application file for complete search history.

(56) References Cited

U.S. PATENT DOCUMENTS 1,907,675 A * 5/1933 Rosen .................... B65D 75/28
229/87.06
2,077,300 A * 4/1937 Abrams ................. B65D 85/76
229/87.01
(Continued)

FOREIGN PATENT DOCUMENTS

CH 674 347 A5 5/1990
CN 203468200 U 3/2014
(Continued)

OTHER PUBLICATIONS

Formal Human Translation of Porte EP 2177437. Published 2010. (Year: 2010).*
(Continued)

Primary Examiner — Ericson M Lachica
(74) Attorney, Agent, or Firm — Nixon & Vanderhye (57) ABSTRACT This method for producing a packaged food product portion includes the following steps: providing a cup defining an inner area for receiving the food product; cold pouring, at a temperature below 50° C., the food product into the receiving area of the cup; covering the food product using a thermally insulating lid arranged such that thermally conducting flaps of the cup extend toward the outside of the lid after the covering step; folding the flaps on an outer face of the lid opposite the receiving area; and heat-sealing the flaps on the outer face.

14 Claims, 6 Drawing Sheets (51) Int. Cl.
*B65B 3/04* (2006.01)
*B65D 75/26* (2006.01)
*B65D 75/68* (2006.01)
*B65D 85/76* (2006.01)
*A23C 19/00* (2006.01)
*B65D 75/28* (2006.01)
*B65B 25/10* (2006.01)
*B29C 65/00* (2006.01)
*B29K 705/02* (2006.01)
*B29C 65/18* (2006.01)
*B29L 31/00* (2006.01)

(52) U.S. Cl.
CPC .............. *B65B 25/10* (2013.01); *B65D 75/26* (2013.01); *B65D 75/28* (2013.01); *B65D 75/68* (2013.01); *B65D 85/76* (2013.01); *B29C 65/18* (2013.01); *B29C 66/0242* (2013.01); *B29C 66/1122* (2013.01); *B29C 66/24221* (2013.01); *B29C 66/3452* (2013.01); *B29C 66/53461* (2013.01); *B29C 66/53462* (2013.01); *B29C 66/612* (2013.01); *B29C 66/71* (2013.01); *B29C 66/72321* (2013.01); *B29C 66/73711* (2013.01); *B29C 66/8122* (2013.01); *B29C 66/81463* (2013.01); *B29C 66/81821* (2013.01); *B29C 66/8322* (2013.01); *B29C 66/849* (2013.01); *B29C 66/919* (2013.01); *B29C 66/949* (2013.01); *B29K 2705/02* (2013.01); *B29L 2031/712* (2013.01)

(56) References Cited

U.S. PATENT DOCUMENTS

| | | | | |
|---|---|---|---|---|
| 3,412,927 | A * | 11/1968 | Baur | B65D 75/68 229/87.05 |
| 3,696,987 | A * | 10/1972 | Schuff | B65D 1/265 229/400 |
| 3,746,155 | A * | 7/1973 | Seeley | B65D 75/32 206/229 |
| 3,924,803 | A * | 12/1975 | de Habsburg | B65D 75/28 229/164.1 |
| 5,776,592 | A * | 7/1998 | Benhayoun | B29C 55/14 428/221 |
| 6,153,238 | A * | 11/2000 | Shannon | A21C 15/005 220/789 |
| 7,318,941 | B2 | 1/2008 | Poupard et al. | |
| 2003/0017237 | A1* | 1/2003 | Poupard | B65D 75/5833 426/122 |
| 2003/0168162 | A1* | 9/2003 | Eile | B29C 66/9241 156/289 |
| 2004/0011007 | A1 | 1/2004 | Kohl et al. | |
| 2006/0231598 | A1* | 10/2006 | Dal | B65D 75/68 229/87.05 |
| 2006/0275531 | A1* | 12/2006 | Dal | B65D 75/66 426/130 |
| 2008/0276569 | A1* | 11/2008 | Dal | B26D 3/10 53/203 |
| 2010/0260995 | A1* | 10/2010 | Pellegatti | C08F 10/00 428/220 |
| 2010/0330232 | A1 | 12/2010 | Thorsen et al. | |
| 2011/0108614 | A1* | 5/2011 | Bonnin | B65D 75/28 229/122.21 |
| 2011/0147254 | A1* | 6/2011 | Pierron | B32B 7/12 206/459.5 |
| 2012/0040113 | A1* | 2/2012 | Sato | G09F 3/0297 428/34.1 |

FOREIGN PATENT DOCUMENTS

| | | | | |
|---|---|---|---|---|
| EP | 1 072 535 | A1 | 1/2001 | |
| EP | 1 500 593 | A2 | 1/2005 | |
| EP | 1 283 808 | B1 | 6/2005 | |
| EP | 1 836 110 | A1 | 9/2007 | |
| EP | 2 008 948 | A2 | 12/2008 | |
| EP | 2 177 437 | A1 | 4/2010 | |
| EP | 2177437 | A1 * | 4/2010 | ........... B65B 7/2871 |
| EP | 2 284 082 | A2 | 2/2011 | |
| EP | 2 238 037 | B1 | 9/2011 | |
| FR | 2 888 571 | A1 | 1/2007 | |
| JP | 2005-040096 | A | 2/2005 | |
| WO | 2006/030128 | A1 | 3/2006 | |
| WO | 2006/075234 | A1 | 7/2006 | |
| WO | 2008/151820 | A1 | 12/2008 | |

OTHER PUBLICATIONS

International Search Report, dated Jun. 23, 2016, from corresponding PCT/EP2016/058283 application.

FR Search Report, dated Mar. 1, 2016, from corresponding FR 1553452 application.

* cited by examiner

METHOD FOR PRODUCING A PACKAGED PORTION OF A FOOD PRODUCT AND PORTION PRODUCED BY SAID METHOD

BACKGROUND OF THE INVENTION

Field of the Invention

The present invention relates to a method for producing a packaged portion of food product, and the packaged portion produced by implementing this method.

Such a packaged portion is generally of the type comprising a cup defining an area for receiving the food product and a lid covering the food product and closing the cup, thermally conductive flaps of the lid being folded on an outer face of the lid opposite the receiving area and sealed to said outer face, the food product being contained in the receiving area and covered by the lid.

Description of the Related Art

The invention more particularly applies to the production of sealed packaged portions of food products poured cold, i.e., at a temperature below 50° C., such as, non-limitingly, fresh cheeses or cheeses obtained by a recombination method (e.g., cheeses described in WO 2006/030128 and WO 2008/151820) or by membranous techniques, packaged in the viscous liquid or pasty state, cheese cold packs, yogurt derivatives or any other fresh dairy products with live cultures, broth cubes or butter.

Most often, food products that are poured cold, when packaged in individual portions, are simply packaged in a sheet of flexible material folded around the dose of product. Examples of food products packaged in this way are butter and fresh cheeses, for example marketed under the Boursin® brand. This type of simple packaging has the drawback of not being sealed, generating quick drying of the product, and therefore a shorter shelf life.

One aim of the invention is thus to obtain a sealed packaging for a food product portion poured cold, so as to avoid drying of the product and to contribute to better storage of the product over time and improved quality of the product. The shelf life of the product will be increased, and export possibilities extended.

Methods for producing sealed packaged portions of food products, allowing the sealed packaging of products that must be poured cold, are known. These methods generally comprise the following steps:
  providing a cup defining an inner area for receiving the food product,
  cold pouring the food product into the receiving area of the cup,
  covering the food product using a lid arranged such that the flaps of the cup are folded toward the outside of the cup after the covering step, and
  heat-sealing the flaps on an inner face of the lid oriented toward the receiving area.

For the sealing step, metal sealing jaws are most often used that are heated and that pinch the flaps and the lid between them, activating a heat-sealing varnish with which the flaps are coated.

Such a method is for example known from EP 1,072,535 and EP 2,284,082. One drawback of this method is that it results in the formation of a collar on the periphery of the portion, making the portion not very esthetically pleasing and relatively impractical. Another drawback of this method is that it requires large quantities of packaging, which is not environmentally friendly.

Methods are also known for producing sealed wrapped portions of food products that can be poured hot, i.e., with a temperature typically greater than 65° C., such as melted cheeses, which make it possible to obtain sealed packaged portions not having a peripheral collar. These methods generally comprise the following steps:
  providing a metal cup defining an inner area for receiving the food product,
  hot pouring the food product into the receiving area of the cup,
  covering the food product using a lid arranged such that the flaps of the metal lid extend toward the outside of the lid after the covering step,
  folding the flaps on an outer face of the lid opposite the receiving area, and
  heat-sealing the flaps on the outer face.

For the sealing step, a metal sealing iron is most often used that is heated and that bears on the flaps, thereby pressing them against the lid and activating a heat-sealing varnish with which the flaps are coated. By exerting this pressure and this heating, the flaps and the lid, which are in contact under this iron, are sealed and the portion is tamped down, having specified that this tamping gives the portion its final shape.

It would be desirable to be able to use such a method with a food product needing to be poured cold, so as to obtain a sealed packaged portion of food product to be poured cold that does not comprise a peripheral collar.

However, the fact that the food product is poured hot in the package constitutes an essential feature of these known methods. Indeed, the heat given off by the food product after it has been poured is used as a major heat input to bring the heat-sealing varnish past its melting temperature and thus allow it to be activated. This heat input in particular makes it possible to seal the portions in a short enough amount of time to keep up with industrial production rhythms.

A problem thus arises to replace the hot pouring step with a cold pouring step. Indeed, by pouring the food product contained in the portion at a temperature below the melting temperature of the heat-sealing varnish, the food product cannot contribute to heating the varnish past its melting temperature; on the contrary, the food product even absorbs a large portion of the calories contributed by the sealing iron. As a result, by replacing the hot pouring step of the aforementioned method with a cold pouring step, the sealing duration is extended considerably, and it becomes impossible to keep up with an industrial production rhythm. Another observed drawback is that the heating of the food product contained in the packaging, caused by the sealing iron, deteriorates the organoleptic qualities of the food product.

One solution to the aforementioned problem is proposed in EP 2,177,437. It consists of heating the cup by induction during sealing.

However, this solution is complex and expensive to implement. Furthermore, it does not completely resolve the problem of heating of the food product, and the resulting risk of loss of the organoleptic qualities.

BRIEF SUMMARY OF THE INVENTION

One aim of the invention is thus to allow simple and inexpensive sealing of a packaged food product portion in which the food product must be poured cold, without forming a protruding collar outside the portion. Other aims are to avoid heating the food product contained in the portion during sealing, and to make it possible to keep up with an industrial production rhythm.

To that end, the invention relates to a method for producing a packaged food product portion, comprising the following steps:

providing a cup defining an inner area for receiving the food product, cold pouring, at a temperature below 50° C., the food product into the receiving area of the cup, covering the food product using a thermally insulating lid arranged such that the thermally conducting flaps of the metal lid extend toward the outside of the lid after the covering step, folding the flaps on an outer face of the lid opposite the receiving area, and heat-sealing the flaps on the outer face.

The fact that the lid is thermally insulating greatly limits the leaking of calories toward the food product during sealing, which makes it possible to achieve the dual aim of reducing the sealing duration and avoiding heating of the food product.

According to specific embodiments of the invention, the method also has one or more of the following features, considered alone or according to any technically possible combination(s):

the sealing step comprises the following sub-steps:
   applying at least one hot sealing iron on the flaps, the flaps being inserted between said sealing iron and the lid, and
   activating at least one thermo-adhesive material provided at the interface between the flaps and the lid using heat contributed to the thermo-adhesive material by the or each sealing iron;

the step for applying the or each sealing iron comprises the successive applications of two sealing irons on the flaps;

the flaps comprise an inner face oriented toward the receiving area, an outer face oriented away from the receiving area, and have a first surface heat transfer coefficient between their inner and outer faces, the lid comprises an inner face oriented toward the receiving area and has a second surface heat transfer coefficient between its outer and inner faces, and the ratio of the first surface heat transfer coefficient to the second surface heat transfer coefficient is greater than or equal to 400, in particular greater than or equal to 800;

the first surface heat transfer coefficient is greater than or equal to $10^7$, in particular greater than or equal to $1.3 \cdot 10^7$;

the second surface heat transfer coefficient is less than or equal to $2.5 \cdot 10^4$, in particular less than or equal to $1.7 \cdot 10^4$;

the flaps have a thermal conductivity greater than or equal to 200 $W \cdot m^{-1} \cdot K^{-1}$;

the lid has a thermal conductivity less than or equal to 0.5 $W \cdot m^{-1} \cdot K^{-1}$;

the flaps are made up primarily, and preferably more than 70%, of metal, in particular aluminum;

the lid is made up primarily, and preferably more than 90%, of plastic, in particular expanded plastic;

the plastic is a polymer, for example expanded oriented polypropylene;

the lid comprises a layer of plastic and a layer of metal deposited on at least one face of the plastic layer, said metal layer being inserted between the thermo-adhesive material and the plastic layer.

The present invention also relates to a packaged food product portion obtained using the production method according to any one of the preceding claims.

"In the context of the present invention, "portion" refers to a quantity of food product in a package having a weight comprised between 5 and 250 g".

In particular, the invention also relates to a packaged portion of the aforementioned type, in which the lid is thermally insulating and the food product is a fresh dairy curd-based product, alone or in a mixture, or a cheese derived from a recombination process.

BRIEF DESCRIPTION OF THE DRAWINGS

Other features and advantages of the invention will appear upon reading the following description, provided solely as an example and done in reference to the appended drawings, in which.

DETAILED DESCRIPTION OF THE PREFERRED EMBODIMENTS

Figures 1, 2:
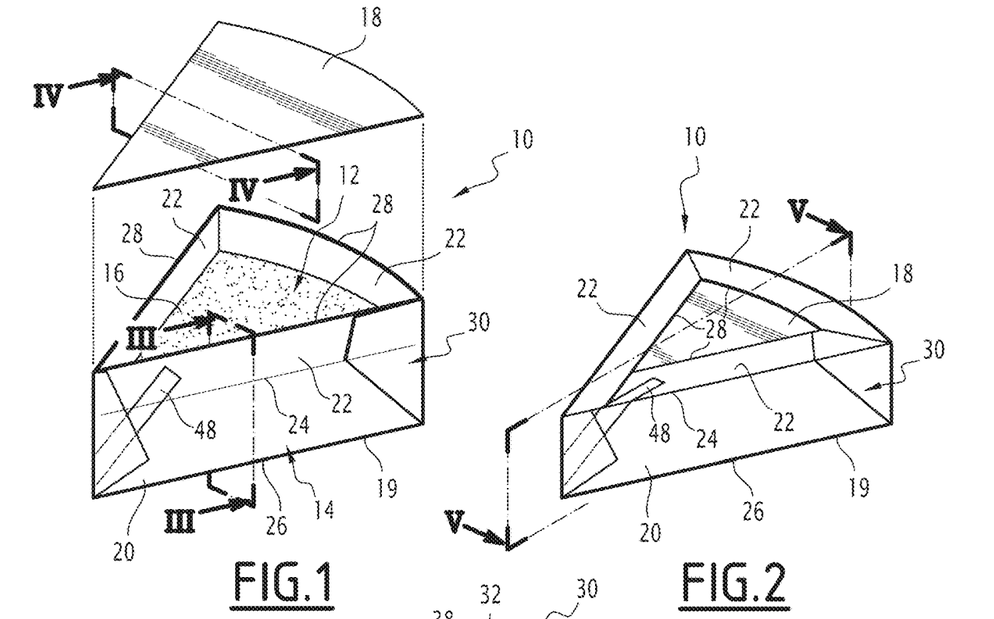
FIG. 1 is a perspective view of a packaged portion according to a first embodiment of the invention, during production, during a step for covering the food product contained in the portion.
FIG. 2 is a perspective view of the packaged portion of FIG. 1, once completed.

The packaged portion 10, shown in FIGS. 1 and 2, is a packaged food product portion containing a food product 12. It comprises a cup 14 defining an area 16 for receiving the food product 12, and a lid 18 covering the food product 12 and closing the cop 14.

The food product 12 is for example a fresh dairy curd-based product, alone or in a mixture, or a cheese derived from a recombination process.

The cup 14 has a bottom 19, a peripheral side wall 20 protruding from the periphery of the bottom 19, substantially perpendicular thereto, and flaps 22 extending from an upper edge 24 of the side wall 20 opposite the lower edge 26 connecting the side wall 20 to the bottom 19. The receiving area 16 is defined between the bottom 19 and the side wall 20.

In the illustrated example, the bottom 19 has a generally triangular shape. Alternatively, the bottom 19 has any other shape, for example a discoid or rectangular shape.

Each flap 22 extends from the upper edge 24 of the side wall 20 to a free edge 28. The distance from the free edge 28 to the upper edge 24 is preferably smaller than the distance from the upper edge 24 to the lower edge 26.

In this first embodiment, the cup 14 comprises a single sheet 30, folded on itself, forming the bottom 19, the side wall 20 and the flaps 22. An example of folding of this sheet 30 to form the cup 14 is for example given in FR 2,888,571.

The sheet 30 is thermally conductive. In particular, the sheet 30 has a thermal conductivity greater than or equal to 200 $W \cdot m^{-1} \cdot K^{-1}$. To that end, the sheet 30 is made up primarily, and preferably more than 70%, of metal, in particular aluminum.

Figure 3:
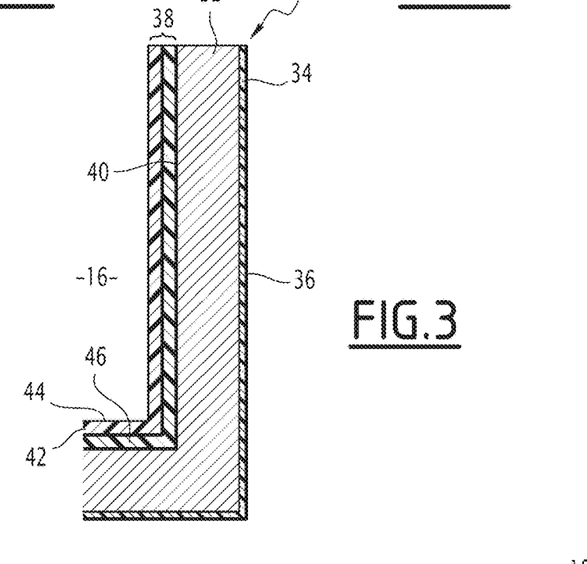
FIG. 3 is a sectional view, along plane III-III of FIG. 1, of part of a cup of the packaged portion of FIG. 1.

In particular, as shown in FIG. 3, the sheet 30 has a multilayer structure comprising: a main layer 32 made from metal, in particular aluminum, defining an inner face 40 of the sheet 30, oriented toward the receiving area 16, and an outer coating 34, deposited on a face of the main layer 32 opposite the inner face 40 and defining an outer face 36 of the sheet 30, oriented away from the receiving area 16.

The main layer 32 makes up more than 70% of the thickness of the sheet 30. It preferably has a thickness comprised between 10 and 12 µm.

The outer coating 34 typically comprises a layer of non-thermo-adhesive lacquer, for example a layer of nitrocellulose lacquer. The outer coating 34 has a thickness comprised between 2 and 4 µm.

The thickness of the sheet 30, considered between its outer 36 and inner 40 faces, is therefore smaller than 20 µm, and in particular smaller than 15 µm. The sheet 30 thus has a first surface heat transfer coefficient, between its inner 40 and outer 36 faces, greater than or equal to $10^7$, in particular greater than or equal to $1.3 \cdot 10^7$.

It will be noted that, since the sheet 30 makes up the flaps 22, the inner 40 and outer 36 faces also make up the inner and outer faces of said flaps 22.

The inner face 40 is covered with an inner coating 38 separate from the sheet 30. This inner coating 38 comprises a thermo-adhesive layer 42, defining an inner face 44 of the coating 38 oriented toward the receiving area 16.

The thermo-adhesive layer 42 is made up of a thermo-adhesive material suitable for forming a bond with a compatible material when it is brought to a temperature above a threshold temperature. Said thermo-adhesive material is preferably a low-temperature thermo-adhesive material, i.e., said special temperature is below 75° C. The threshold temperature remains, however, greater than 58° C., so as to avoid any interaction between the thermo-adhesive layer 42 and the food product 12 at the normal conservation temperature of the food product 12. The threshold temperature is typically a melting temperature of the thermo-adhesive material.

The thermo-adhesive layer 42 for example comprises a vinyl layer.

Preferably, as shown, the inner coating 38 comprises, in addition to the thermo-adhesive layer 42, a protective layer 46 inserted between the thermo-adhesive layer 42 and the sheet 30. This protective layer 46 is suitable for protecting the sheet 30 from corrosion.

The protective layer 46 for example comprises a vinyl layer.

Alternatively (not shown), the inner coating 38 is formed by the thermo-adhesive layer 42 alone, the latter then preferably being suitable for protecting the sheet 30 from corrosion.

Examples of other materials that may be included in the composition of the thermo-adhesive layer 42 and/or the protective layer 46 are materials such as lacquer, for example comprising polymers of the plasticized PVC type, or copolymers of PVC with ethylene, vinyl laurate or vinyl acetate, or olefin-based polymers such as ethylene, butadiene, and copolymers thereof, or ester-based polymers such as PLA, vinyl acetate, fatty acid vinyl esters, acrylic acid fatty alcohols and methacrylic acid fatty alcohols, or polymers with a base of terephthalic acid and modified or unmodified glycol ethylene, and materials obtained by extruding a polymer, typically a polyolefin with a base of ethylene, butadiene and copolymers thereof, and/or a vinyl polymer with a base of vinyl chloride, and/or fatty acid vinyl esters, and/or acrylic fatty acid alcohols, and/or methacrylic acid fatty alcohols, said extrusion typically being done using the curtain technology of the raw material in viscous liquid state, curtain technology of the material in the form of an aqueous suspension or emulsion, coating of a suspension or emulsion of polymer and water, for example by spraying or wiping with a brush or ribbon.

The total thickness of the inner coating 38 is preferably comprised between 4 and 6 µm.

Returning to FIGS. 1 and 2, the cup 14 also comprises an element 48 for guiding tears in the sheet 20. This guiding element 48 is typically made up of at least one guiding strip attached on the inner face 40 of the sheet 30 and sealed to the latter. An example arrangement of said guiding strip on the inner face 40 is provided in FR 2,888,571.

The lid 18 is across from the bottom 19 relative to the receiving area 16, i.e., the receiving area 16 is inserted between the lid 18 and the bottom 19.

The lid 18 is substantially flat.

The lid 18 is thermally insulating. In particular, the lid 18 has a thermal conductivity less than or equal to 0.5 $W \cdot m^{-1} \cdot K^{-1}$. To that end, the lid 18 is made up primarily, and preferably more than 80%, or even more than 90%, of plastic, in particular expanded plastic. Said plastic is advantageously a polymer, for example oriented polypropylene (OPP).

Figure 4:
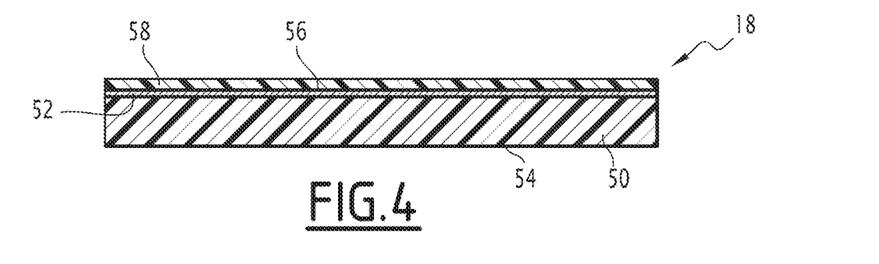
FIG. 4 is a sectional view, along plane IV-IV of FIG. 1, of a lid of the packaged portion of FIG. 1, FIGS. 5 to 9 are sectional views, along plane V-V of FIG. 2, of the packaged portion of FIG. 1 during successive steps of a method for producing said packaged portion.

In particular, as shown in FIG. 4, the lid 18 has a multilayer structure comprising: a main layer 50 made from plastic, in particular expanded plastic, for example expanded OPP, and an outer coating 52.

The main layer 50 makes up more than 90%, preferably more than 99%, of the thickness of the lid 18. It in particular has a thickness comprised between 20 and 60 µm, preferably comprised between 30 and 40 µm.

The main layer 50 defines an inner face 54 of the lid 18, oriented toward the receiving area 16.

The outer coating 52 is deposited on a face of the main layer 50 opposite the inner face 54. It defines an outer face 56 of the lid 18, oriented away from the receiving area 16.

The outer coating 52 comprises a metal layer and is advantageously made up of said metal layer. This metal layer makes it possible to form a light and gas barrier that protects the food product 12. It is preferably made up primarily of aluminum.

The outer coating 52 advantageously has a thickness of several Ångströms. To that end, the metal layer is deposited by vacuum evaporation of the metal making up said layer. Thus, the effect of the metal layer on the thermal conductivity of the lid 18 is negligible.

The thickness of the lid 18, considered between its inner 54 and outer 56 faces, is therefore greater than 20 μm, and in particular greater than 30 μm. The lid 18 thus has a second surface heat transfer coefficient, between its inner 54 and outer 56 faces, less than or equal to $2 \cdot 5 \cdot 10^4$, in particular less than or equal to $1 \cdot 7 \cdot 10^4$.

The ratio of the first surface heat transfer coefficient to the second surface heat transfer coefficient is thus greater than or equal to 400, and is in particular greater than or equal to 800. This major difference between the first and second heat transfer coefficients makes it possible to ensure that, if a hot element is applied on the outer face 36 of the flaps 22, the calories will be transferred quickly from the hot element to the interface between the flaps 22 and the lid 18, but that these calories will leak much more slowly through the lid 18 to the food product 12.

The outer face 56 is coated with a thermo-adhesive coating 58, separate from the lid 18.

This thermo-adhesive coating 58 is made up of a thermo-adhesive material suitable for forming a bond with a compatible material when it is brought to a temperature above a threshold temperature. Said thermo-adhesive material is preferably a low-temperature thermo-adhesive material, i.e., said special temperature is below 75° C. The threshold temperature remains, however, greater than 58° C., so as to avoid any interaction between the thermo-adhesive coating 58 and the food product 12 at the normal conservation temperature of the food product 12. The threshold temperature is typically a melting temperature of the thermo-adhesive material.

The adhesive materials of the thermo-adhesive coating 58 and the thermo-adhesive layer 42 are compatible materials.

Returning to FIGS. 1 and 2, the flaps 22 are folded on the outer face 56 of the lid 18 and are tightly sealed to said outer face 56 via the thermo-adhesive coating 58 and the thermo-adhesive layer 42. The flaps 22 are in particular folded toward the inside of the cup 14 relative to the side wall 20.

A method for producing the packaged portion 10 will now be described in reference to FIGS. 5 to 9.

Figure 5:
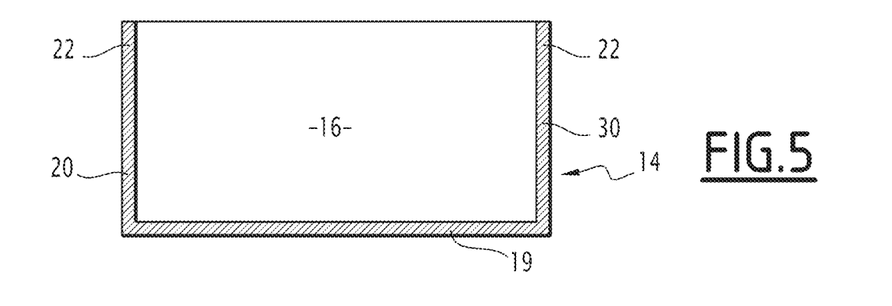

First of all, as shown in FIG. 5, the sheet 30 is folded so as to form the cup 14. To that end, the sheet 30 is for example folded as described in FR 2,888,571.

Figure 6:
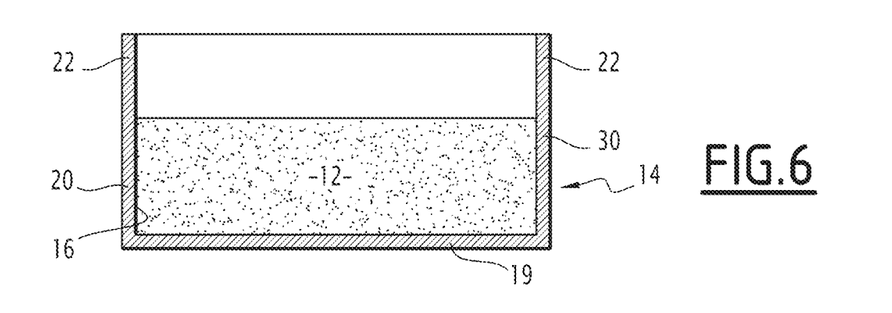

Next, as shown in FIG. 6, the food product 12 is poured cold, i.e., at a temperature below 50° C., the food product into the receiving area 16 of the cup 14. The food product 12 is in particular poured at a temperature comprised between 0 and 30° C., preferably comprised between 0 and 20° C., and more particularly between 5 and 15° C.

Figure 7:
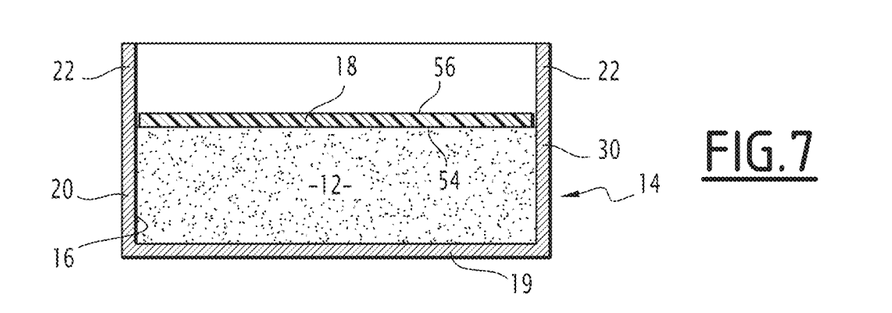

Then, the food product 12 is covered using the lid 18. To that end, the lid 18 is inserted between the flaps 22, its inner face 54 being oriented toward the food product 12, and is lowered between the flaps 22 until it comes into contact with the food product 12, as shown in FIG. 7. Thus, at the end of this covering step, the flaps 22 extend outside the lid 18, i.e., the lid 18 is inserted between the flaps 22 and the food product 12.

Figure 8:
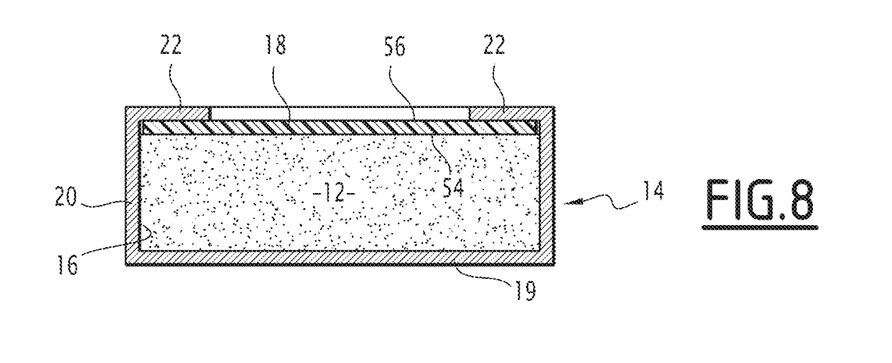

The covering of the food product 12 with the lid 18 is followed by a step, shown in FIG. 8, for folding the flaps 22 toward the inside of the cup 14, on the outer face 56 of the lid 18.

Figure 9:
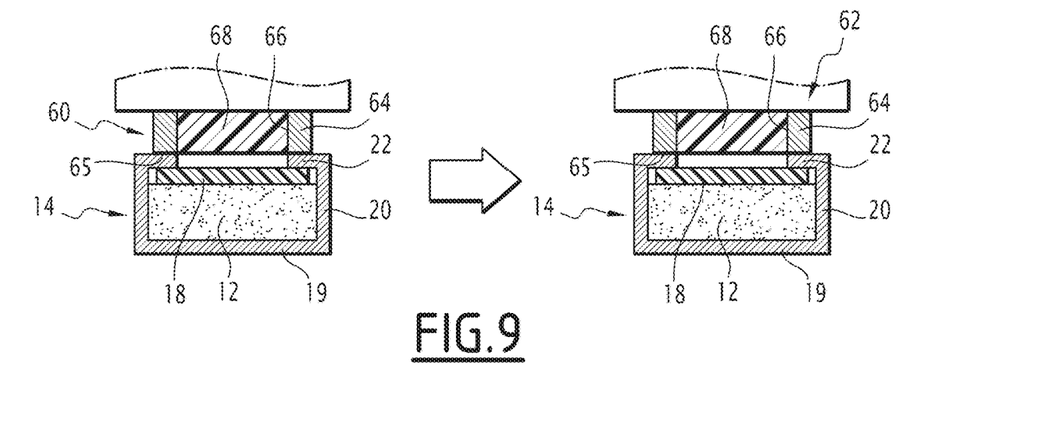

Then, as shown in FIG. 9, the flaps 22 are heat sealed, under pressure, on the outer face 56 of the lid 18.

This sealing of the flaps 22 on the lid 18 preferably, as shown, comprises a pre-sealing step and a final sealing step.

The pre-sealing step comprises applying a first hot sealing iron 60 on the flaps 22, the flaps 22 being inserted between said first iron 60 and the lid 18, the first sealing iron 60 pressing the flaps 22 against the lid 18. The final step comprises applying a second hot sealing iron 62 on the flaps 22, the flaps 22 being inserted between said second iron 62 and the lid 18, the second sealing iron 62 pressing the flaps 22 against the lid 18. Said applications are successive applications following one another preferably with a time interval of less than 2 s.

Each of the sealing irons 60, 62 comprises a hot metal member 64, i.e., at a temperature typically greater than 120° C., defining a contact face 65 with the flaps, said contact face 65 having substantially the shape of a contour of the lid 18. Preferably, the metal member 64 is, however, at a temperature below 140° C., so as to prevent its application against the flaps 22 from damaging the plastic of the lid 18.

In order to prevent the metal member 64 from being in contact with the lid 18, which could damage the lid 18, a recess 66 is formed in the center of the metal member 64, the contact face 65 defining the periphery of said recess 66.

An insulating insert 68 is housed in said recess 66 and is flush with the contact face 65. This prevents the pressure exerted by the sealing irons 60, 62 on the flaps 22 from causing a deformation of the sealed portion 10 at its periphery.

This insulating insert 68 is made up of a thermoplastic or thermosetting material with a high melting point, for example bakelite, a bakelited cotton canvas, or polyether ether ketone.

During the application of each sealing iron 60, 62 against the flaps 22, heat is transferred from the sealing iron 60, 62 to the thermo-adhesive coating 58 and to the thermo-adhesive layer 42 through the flaps 22. This heat transfer is quick, since the flaps 22 are thermally conductive. The lid 18 being insulating, it prevents the heat transferred to the thermo-adhesive coating 58 and the thermo-adhesive layer 42 from leaking toward the food product 12. This heat accumulates at the interface between the flaps 22 and the lid 18, which causes a rapid rise in the temperature of the thermo-adhesive coating 58 and the thermo-adhesive layer 42 up to a temperature above the threshold temperature of the component thermo-adhesive materials. Said thermo-adhesive materials are thus activated by this heat and form a bond between the flaps 22 and the lid 18. It is this bond that sees to the sealing of the flaps 22 to the lid 18.

It will be noted that using the successive application of two sealing irons 60, 62, rather than the application of a single sealing iron, makes it possible to reduce the application duration of each sealing iron 60, 62 greatly in order to obtain tight sealing of the portion 10. It is thus possible to increase the production rhythm of the packaged portion 10 until reaching a rhythm identical to the production rhythm of hot-poured melted cheese portions.

Figures 10, 11:
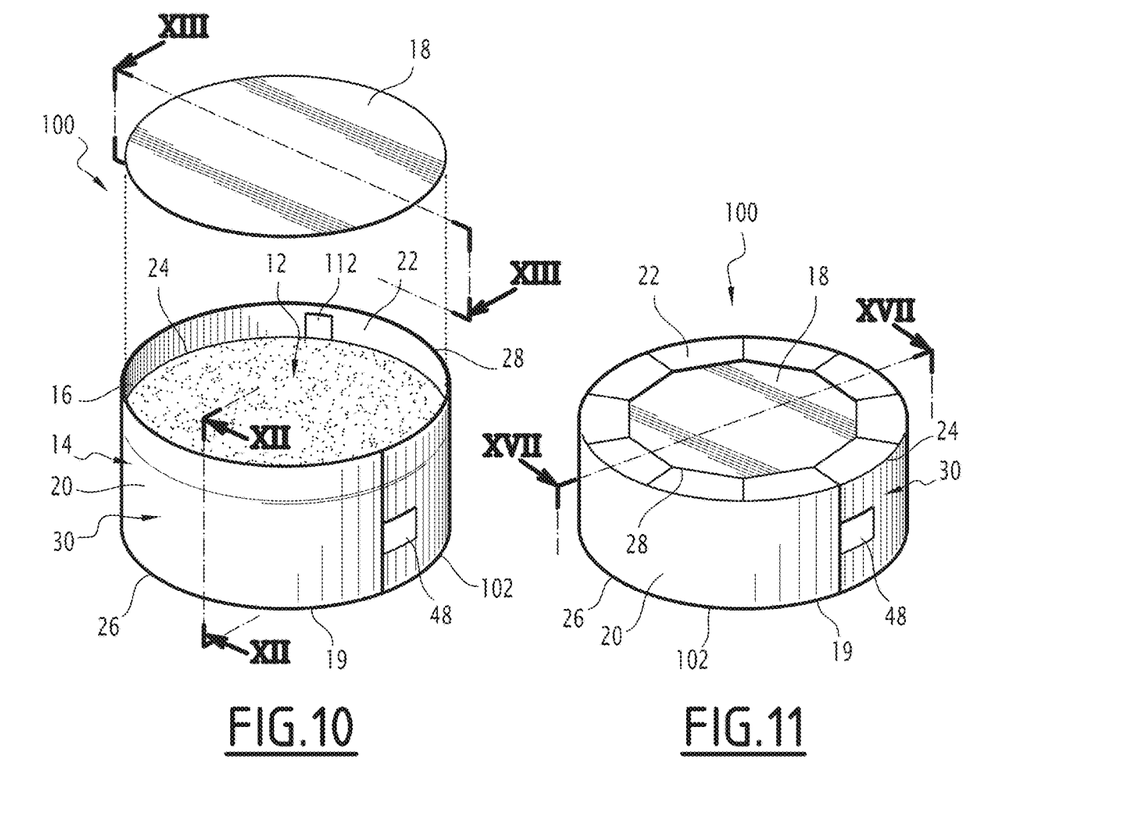
FIG. 10 is a perspective view of a packaged portion according to a second embodiment of the invention, during production, during a step for covering the food product contained in the portion.
FIG. 11 is a perspective view of the packaged portion of FIG. 10, once completed.

The description of the packaged portion 10 provided above is applicable in large part to the packaged portion 100 shown in FIGS. 10 and 11. For simplification reasons, identical reference signs have therefore been used to designate the elements shared by the packaged portions 10 and 100, and the shared features have been omitted from the description below.

The packaged portion 100 differs from the packaged portion 10 primarily in that the sheet 30 does not make up the bottom 19 of the cup. Unlike the packaged portion 10, the bottom 19 here in fact comprises a base 102 sealed to the sheet 30. The sheet 30, however, still makes up the side wall 20 and the flaps 22.

Figure 12:
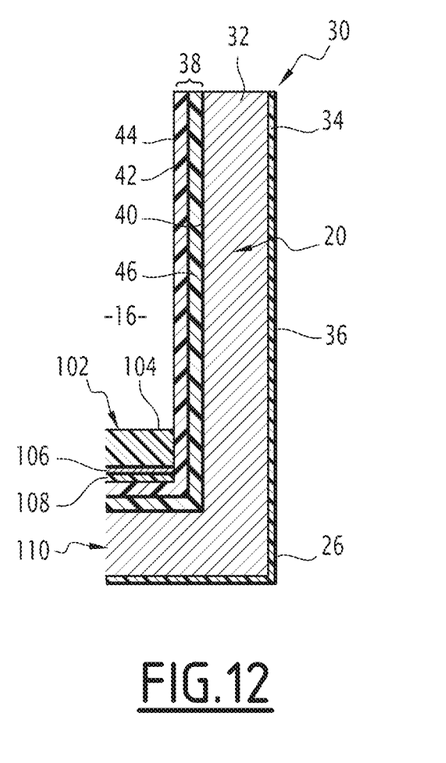
FIG. 12 is a sectional view, along plane XII-XII of FIG. 10, of part of a cup of the packaged portion of FIG. 10.

In reference to FIG. 12, the base 102 is substantially planar. It has an inner face 104, oriented toward the receiving area 16, and an outer face 106, oriented away from the receiving area 16.

The outer face 106 is coated with a thermo-adhesive coating 108, separate from the base 102.

This thermo-adhesive coating 108 is made up of a thermo-adhesive material suitable for forming a bond with a compatible material when it is brought to a temperature above a threshold temperature. Said thermo-adhesive material is preferably a low-temperature thermo-adhesive material, i.e., said special temperature is below 75° C. The threshold temperature remains, however, greater than 58° C., so as to avoid any interaction between the thermo-adhesive coating 108 and the food product 12 at the normal conservation temperature of the food product 12. The threshold temperature is typically a melting temperature of the thermo-adhesive material.

The adhesive materials of the thermo-adhesive coating 108 and the thermo-adhesive layer 42 are compatible materials.

Figure 13:
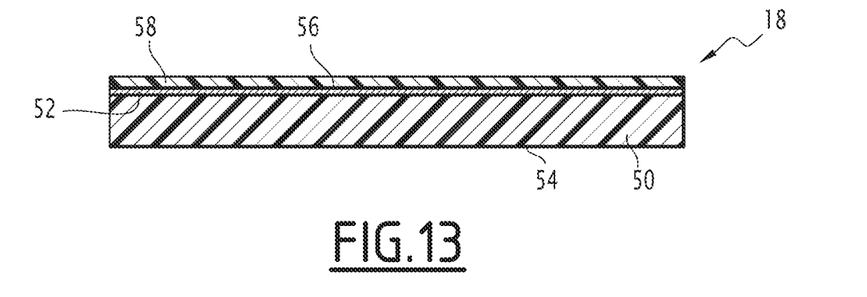
FIG. 13 is a sectional view, along plane XIII-XIII of FIG. 10, of a lid of the packaged portion of FIG. 10, and FIGS. 14 to 18 are sectional views, along plane XIV-XIV of FIG. 11, of the packaged portion of FIG. 10 during successive steps of a method for producing said packaged portion.

In the illustrated example, the base 102 is identical to the lid 18. This makes it possible to facilitate the production of the packaged portion 100.

The sheet 30 comprises a border region 110 connected to the side wall 20 by the lower edge 26 of the latter. This border region 110 is folded and sealed tightly on the outer face 106 of the base 102.

This embodiment of the cup 14 in two parts (the sheet 30 and the base 102) makes it possible to give the packaged portion 100 an original shape. In particular, this embodiment of the cup 14 in two parts makes it easily possible to give the packaged portion 100 the cylindrical shape of revolution visible in FIGS. 10 and 11, shape that is difficult to produce with a single-piece cup 14 as is the case for the packaged portion 10. This embodiment of the cup 14 in fact makes it possible to obtain a cylindrical portion with no fold on the side wall 20 and have the tear guiding strip in the sheet 30 arranged along lower 26 and upper 24 edges of the side wall 20.

Another difference between the packaged portion 100 and the packaged portion 10 is that the packaged portion 100 comprises two gripping tongues 112 housed in the receiving area 16. A first of said tongues 112 is astride the side wall 20 and the lid 18 while being sealed to the lid 18, and the second tongue 112 is astride the side wall 20 and the base 102 while being sealed to the base 102. These tongues 112 make it possible to facilitate the removal of the lid 18 and the base 102 by a consumer after tearing the side wall 20.

Figure 14:
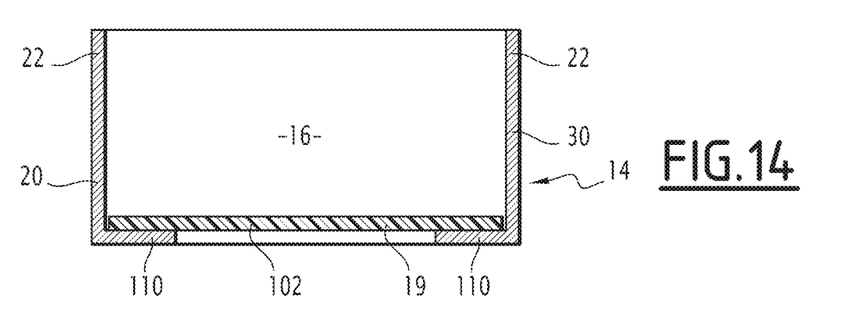
Figure 15:
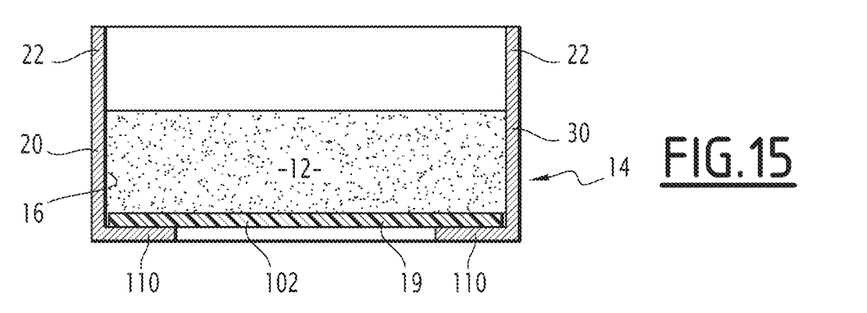
Figure 16:
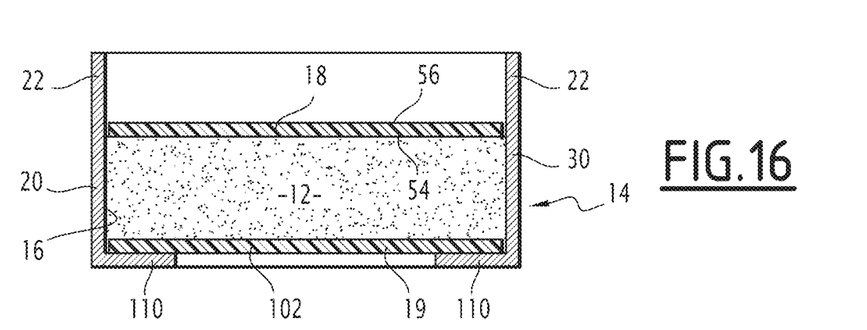
Figure 17:
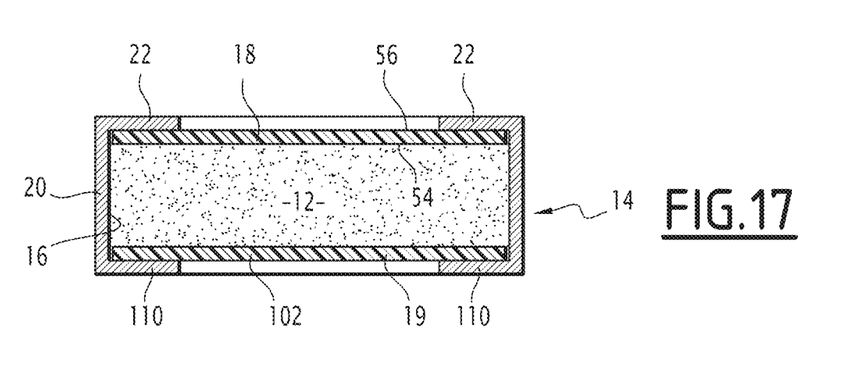
Figure 18:
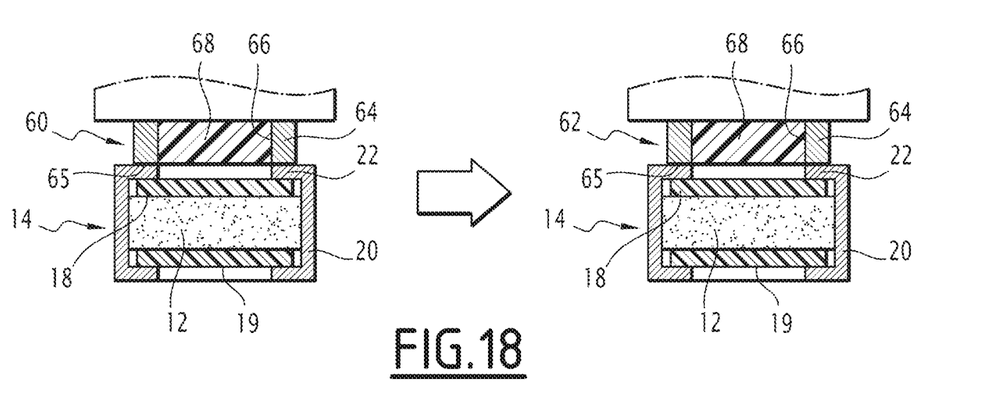

The method for producing the packaged portion 100 is also substantially identical to the method for producing the packaged portion 10. The only difference between these methods consists of the steps for supplying the cup 14, which here comprises the following steps:

folding the sheet 30 so as to form a tube, for example by winding the sheet 30 around a mandrel, inserting the base 102 inside the tube, the base 102 being oriented perpendicular to the axis of the tube, until becoming flush with the tear guiding element 48, folding the border region 110 on the outer face 106 of the base 102, and heat-sealing the border region 110 on the outer face 106.

For the description of the rest of the method for producing the packaged portion 100, the reader is invited to see the description of the method for producing the packaged portion 10, FIGS. 14, 15, 16, 17 and 18 respectively corresponding to FIGS. 5, 6, 7, 8 and 9.

Owing to the method described above, it is thus easily possible to produce tight sealed packaged portions of food products that must be poured cold, without the obtained packaged portion having a peripheral collar.

This method may further be implemented easily, since it requires very little adaptation of the existing production machines already used to produce sealed packaged portions of food products poured hot: most of the existing tools can in fact be reused, the main necessary adaptations consisting of adding anti-offset bars to limit the risk of offset related to the use of plastic, modifying the spools supplying the component material of the lid, and adding an additional sealing unit.

The invention claimed is:

1. A method for producing a packaged food product portion, the method comprising the following steps:

providing a cup defining an inner area receiving a food product, cold pouring, at a temperature below 50° C., the food product into the inner area of the cup, covering the food product using a lid arranged such that thermally conducting flaps of the cup, which are thermally conducting, extend outside the lid after the covering step, folding the thermally conducting flaps on an outer face of the lid opposite the inner area of the cup, and heat-sealing the thermally conducting flaps on the outer face of the lid, wherein the lid is thermally insulating and the lid is made up primarily of expanded plastic, wherein the step for heat-sealing the thermally conducting flaps on the outer face of the lid comprises a pre-sealing step and a final sealing step, the pre-sealing step comprises applying a first hot sealing iron on the thermally conducting flaps, the thermally conducting flaps being inserted between said first hot sealing iron and the lid, the first hot sealing iron pressing the thermally conducting flaps of the cup against the lid, and the final sealing step comprises applying a second hot sealing iron on the thermally conducting flaps, the thermally conducting flaps being inserted between said second hot sealing iron and the lid, the second hot sealing iron pressing the thermally conducting flaps against the lid, wherein said pre-sealing step and said final sealing step further are successive applications following one another within a time interval of less than 2 seconds, wherein the first hot sealing iron and the second hot sealing iron are distinct from one another, the first hot sealing iron being removed between the pre-sealing step and the final sealing step, wherein the cup comprises a single sheet, the single sheet having a multilayer structure comprising: a main layer made from metal, defining an inner face of the single sheet, oriented toward the inner area of the cup, and an outer coating deposited on a face of the main layer opposite the inner face of the single sheet and defining an outer face of the single sheet oriented away from the inner area of the cup, wherein the main layer makes up more than 70% of the thickness of the single sheet, and the outer coating comprises a layer of non-thermo-adhesive lacquer, wherein the inner face of the single sheet is covered with an inner coating separate from the single sheet, the inner coating comprising a thermo-adhesive layer, defining an inner face of the coating oriented toward the inner area of the cup, and wherein the lid has a multilayer structure comprising: a main layer made from expanded plastic and an outer coating, the main layer making up more than 90% of the thickness of the lid, and the outer coating comprising a metal layer.

2. The production method according to claim 1, wherein at least one thermo-adhesive material is provided at an interface between the thermally conducting flaps and the lid, and wherein the pre-sealing step comprises a sub-step of activating the at least one thermo-adhesive material provided at the interface between the thermally conducting flaps and the lid using heat provided to the at least one thermo-adhesive material by the first hot sealing iron, and wherein the final sealing step comprises a sub-step of activating at least one thermo-adhesive material provided at an interface between the thermally conducting flaps and the lid using heat provided to the at least one thermo-adhesive material by the second hot sealing iron.

3. The production method according to claim 1, wherein the thermally conducting flaps comprise an inner face oriented toward the inner area of the cup, an outer face oriented away from the inner area of the cup, and have a first surface heat transfer coefficient between their inner and outer faces, the lid comprises an inner face oriented toward the inner area of the cup and has a second surface heat transfer coefficient between its outer and inner faces, and the ratio of the first surface heat transfer coefficient to the second surface heat transfer coefficient is greater than or equal to 400.

4. The production method according to claim 3, wherein the first surface heat transfer coefficient is greater than or equal to $10^7$ $W \cdot m^{-2} \cdot K^{-1}$.

5. The production method according to claim 4, wherein the second surface heat transfer coefficient is less than or equal to $2 \cdot 5 \cdot 10^4$ $W \cdot m^{-2} \cdot K^{-1}$.

6. The production method according to claim 1,
wherein the thermally conducting flaps have a thermal conductivity greater than or equal to 200 $W \cdot m^{-1} \cdot K^{-1}$.

7. The production method according to claim 1, wherein the lid has a thermal conductivity less than or equal to 0.5 $W \cdot m^{-1} \cdot K^{-1}$.

8. The production method according to claim 1, wherein the thermally conducting flaps are made up primarily of metal.

9. The production method according to claim 8, wherein the thermally conducting flaps are made up primarily of aluminum.

10. The production method according to claim 8, wherein the thermally conducting flaps comprise the main layer made from metal of the single sheet, defining an inner face of the thermally conducting flaps oriented towards the inner area of the cup, and the outer coating of the single sheet, deposited on the face of the main layer opposite the inner face of the single sheet and defining an outer face of the thermally conducting flaps, oriented away from the inner area of the cup.

11. The production method according to claim 10, wherein the inner face of the thermally conducting flaps is covered with the inner coating comprising the thermo-adhesive layer and a protective layer inserted between the thermo-adhesive layer and the thermally conducting flaps.

12. The production method according to claim 1, wherein the expanded plastic is an expanded oriented polypropylene.

13. The production method according to claim 1, wherein the metal layer is deposited by vacuum evaporation of the metal making up said metal layer.

14. The production method according to claim 1, wherein the pre-sealing step comprises applying the first hot sealing iron at a temperature greater than 120° C. and less than 140° C. on the thermally conducting flaps, pressing the thermally conducting flaps against the lid, and the final sealing step comprises applying the second hot sealing iron at a temperature greater than 120° C. and less than 140° C. on the thermally conducting flaps, pressing the thermally conducting flaps against the lid.

* * * * *